US011790635B2

(12) United States Patent
Watanabe et al.

(10) Patent No.: US 11,790,635 B2
(45) Date of Patent: Oct. 17, 2023

(54) LEARNING DEVICE, SEARCH DEVICE, LEARNING METHOD, SEARCH METHOD, LEARNING PROGRAM, AND SEARCH PROGRAM

(71) Applicant: NIPPON TELEGRAPH AND TELEPHONE CORPORATION, Tokyo (JP)

(72) Inventors: Yukito Watanabe, Tokyo (JP); Takayuki Umeda, Tokyo (JP); Jun Shimamura, Tokyo (JP); Atsushi Sagata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 15 days.

(21) Appl. No.: 17/619,239

(22) PCT Filed: Jun. 17, 2019

(86) PCT No.: PCT/JP2019/023976
§ 371 (c)(1),
(2) Date: Dec. 14, 2021

(87) PCT Pub. No.: WO2020/255227
PCT Pub. Date: Dec. 24, 2020

(65) Prior Publication Data
US 2022/0284695 A1 Sep. 8, 2022

(51) Int. Cl.
G06V 10/74 (2022.01)
G06F 16/532 (2019.01)
(Continued)

(52) U.S. Cl.
CPC .......... G06V 10/761 (2022.01); G06F 16/532 (2019.01); G06F 16/56 (2019.01);
(Continued)

(58) Field of Classification Search
CPC .... G06V 10/761; G06V 10/40; G06V 10/778; G06V 10/82; G06V 10/462; G06F 16/532; G06F 16/56; G06F 18/22; G06T 7/00
See application file for complete search history.

(56) References Cited

U.S. PATENT DOCUMENTS

| 2006/0112095 A1* | 5/2006 | Xie | G06F 16/48 |
| | | | 707/999.005 |
| 2011/0170781 A1* | 7/2011 | Bronstein | G06T 7/33 |
| | | | 382/190 |

(Continued)

FOREIGN PATENT DOCUMENTS

| JP | 201716501 A | 1/2017 |
| JP | 2018147392 A * | 9/2018 |

OTHER PUBLICATIONS

Takayuki Umeda et al., "Model Learning Device, Score Calculation Device, Method, Data Structure, and Program", Google Translation of JP2018147392A (Year: 2018).*

(Continued)

Primary Examiner — Aaron W Carter

(57) ABSTRACT

A retrieval apparatus includes a first retrieval unit, a second retrieval unit, and an integration unit that calculates an integrated similarity by integrating a first similarity calculated by the first retrieval unit and a second similarity calculated by the second retrieval unit. For similarities between a basic image, an image similar to the basic image, and an image dissimilar to the basic image of the reference images, at least the feature extraction of the first retrieval unit is learned such that a margin based on a second similarity between the basic image and the similar image and a second similarity between the basic image and the dissimilar image increases as the second similarity between the basic image and the dissimilar image increases relative (Continued)

to the second similarity between the basic image and the similar image.

12 Claims, 5 Drawing Sheets

(51) Int. Cl.
  *G06F 16/56* (2019.01)
  *G06V 10/778* (2022.01)
  *G06V 10/40* (2022.01)
  *G06V 10/82* (2022.01)
(52) U.S. Cl.
  CPC ............ *G06V 10/40* (2022.01); *G06V 10/778* (2022.01); *G06V 10/82* (2022.01)

(56) References Cited

U.S. PATENT DOCUMENTS

| | | | | |
|---|---|---|---|---|
| 2012/0114256 | A1* | 5/2012 | Akgul | G06F 16/583 382/218 |
| 2013/0290222 | A1* | 10/2013 | Gordo | G06F 18/2155 707/769 |
| 2017/0262478 | A1* | 9/2017 | Zepeda Salvatierra | G06V 10/464 |
| 2019/0286652 | A1* | 9/2019 | Habbecke | A61B 90/37 |
| 2020/0327363 | A1* | 10/2020 | Chen | G06F 16/53 |
| 2021/0303903 | A1* | 9/2021 | Watanabe | G06T 3/4046 |
| 2022/0019841 | A1* | 1/2022 | Hosono | G06T 7/62 |
| 2022/0188975 | A1* | 6/2022 | Watanabe | G06T 3/4053 |
| 2022/0222918 | A1* | 7/2022 | Mou | G06F 16/55 |
| 2022/0284695 | A1* | 9/2022 | Watanabe | G06F 16/532 |
| 2022/0358334 | A1* | 11/2022 | Chen | G06V 10/82 |
| 2023/0005268 | A1* | 1/2023 | Tamura | G06V 10/62 |
| 2023/0062289 | A1* | 3/2023 | Amma | G06V 10/82 |

OTHER PUBLICATIONS

David G. Lowe (2004) "Distinctive Image Features from Scale-Invariant Keypoints" International Journal of Computer Vision, Jan. 5, 2004.

Gordo et al. (2017) "End-to-end learning of deep visual representations for image retrieval" IJCV, May 5, 2017.

* cited by examiner

LEARNING DEVICE, SEARCH DEVICE, LEARNING METHOD, SEARCH METHOD, LEARNING PROGRAM, AND SEARCH PROGRAM

CROSS-REFERENCE TO RELATED APPLICATIONS

This application is a U.S. National Stage Application filed under 35 U.S.C. § 371 claiming priority to International Patent Application No. PCT/JP2019/023976, filed on 17 Jun. 2019, the disclosure of which is hereby incorporated herein by reference in its entirety.

TECHNICAL FIELD

The disclosed technique relates to a learning apparatus, a retrieval apparatus, a learning method, a retrieval method, a learning program, and a retrieval program.

BACKGROUND ART

As compact imaging devices such as a smartphone have been widely used, there is a growing need for techniques for recognizing objects in an image of any subject in various locations and environments.

Various techniques for recognizing objects in an image have been disclosed in the related art. The outline of a typical process based on image retrieval will be described below in accordance with PTL 1. First, multiple characteristic partial regions are detected from an image, and then the characteristics of the partial regions are expressed as feature vectors including real values or integer values. Such a feature vector is generally called "local feature amount". Scale Invariant Feature Transform (SIFT) described in NPL 1 is frequently used as a local feature amount. Subsequently, the feature vectors of partial regions included in two different images are compared to each other to determine the identity. If multiple objects are identical to each other, the two images are similar to each other and are likely to include identical objects. Otherwise the images are less likely to include identical objects. A reference image database is constructed using a reference image including an object to be recognized. An object in a query image, which is an additionally inputted image, can be identified by searching the reference image including the same object.

Furthermore, NPL 2 discloses a method using a convolutional neural network (CNN). A feature vector is extracted from an image by using the CNN. A search is then performed by calculating, for example, a cosine similarity as a similarity between the feature vectors included in two different images. CNN learning is performed using learning data on three images: a basic image, an image similar to the basic image, and an image dissimilar to the basic image. The CNN learning is performed so as to reduce a loss function $\frac{1}{2} \times \max(0, d_p - d_n + m)$ where $d_p$ is a distance between the feature vectors of similar images and $d_n$ is a distance between the feature vectors of dissimilar images. $m$ is the parameter of a fixed value indicating a margin that is a difference in distance.

Moreover, a retrieval method of combining the retrieval results of multiple retrieval methods is generally known. For example, regarding a similarity between a query image and a reference image, a similarity x calculated by using a local feature amount and a similarity y calculated by using a CNN are integrated by the weighted linear sum $ax+by$ of the similarities, so that a final similarity is calculated. A retrieval result is outputted according to the final similarity. The effect of improving accuracy by combining multiple complementary retrieval methods is widely known.

CITATION LIST

Non Patent Literature

[NPL 1] D. G. Lowe. Distinctive Image Features from Scale-Invariant Keypoints, International Journal of Computer Vision, pp. 91-110, 2004.
[NPL 2] A. Gordo, J. Almazan, J. Revaud, and D. Larlus. End-to-end learning of deep visual representations for image retrieval, IJCV, pp. 1-18, 2017.

Patent Literature

[PTL 1] Japanese Patent Application Publication No. 2017-16501

SUMMARY OF THE INVENTION

Technical Problem

In the method using the CNN in NPL 2, however, a search is assumed to be performed by the CNN alone. Combination with other retrieval methods of, for example, PTL 1 is not taken into consideration. Hence, even when the combined retrieval methods including retrieval by the CNN may be used, in a case where the retrieval methods of each have the same weakness to a specific kind of images, a different object may be retrieved and it leads to lower retrieval accuracy.

The disclosed technique has been devised in view of the circumstances. An object of the disclosed technique is to provide a retrieval apparatus, a retrieval method, and a retrieval program that can accurately retrieve an object in an image by complementarily combining multiple image retrieval methods.

Another object of the disclosed technique is to provide a learning apparatus, a learning method, and a learning program that enable learning of a neural network for accurately retrieving an object in an image by complementarily combining multiple image retrieval methods.

Means for Solving the Problem

A first aspect of the present disclosure is a retrieval apparatus including: a first retrieval unit that receives a query image to be retrieved and calculates a first similarity as a similarity between feature vectors, the first similarity being calculated between a feature vector extracted from the query image through learned feature extraction for outputting the feature vector and a feature vector extracted from reference images labeled by the feature extraction; a second retrieval unit that calculates a second similarity as a similarity determined using information on features, based on information on a feature different from the feature vector of the query image and information on the features of the reference images; and an integration unit that calculates an integrated similarity by integrating the first similarity calculated by the first retrieval unit and the second similarity calculated by the second retrieval unit, wherein for similarities between a basic image, an image similar to the basic image, and an image dissimilar to the basic image of the reference images, at least the feature extraction of the first retrieval unit is learned such that a margin based on a second similarity between the basic image and the similar image and a second similarity between the basic image and the dissimilar image increases as the second similarity between the basic image and the dissimilar image increases relative to the second similarity between the basic image and the similar image.

A second aspect of the present disclosure is a learning apparatus including: a second retrieval unit that calculates a second similarity for a combination of reference images by using information on features different from feature vectors of the labeled reference images, the second similarity being calculated as a similarity determined using the information on the features; the reference images including a basic image as a reference of the labeling, a similar image that is the reference image similar to the basic image, and a dissimilar image that is the reference image dissimilar to the basic image, and a parameter update unit that updates a parameter of a neural network such that a margin increases as a second similarity between the basic image and the dissimilar image increases relative to a second similarity between the basic image and the similar image, the parameter being updated by using a loss function including a first similarity between the feature vector of the basic image and the feature vector of the similar image, a first similarity between the feature vector of the basic image and the feature vector of the dissimilar image, and the margin based on the second similarity between the basic image and the similar image and the second similarity between the basic image and the dissimilar image, the feature vectors being outputted from the neural network for receiving a predetermined image and outputting the feature vectors.

A third aspect of the present disclosure is a retrieval method for causing a computer to perform processing including: receiving a query image to be retrieved and calculating a first similarity as a similarity between feature vectors, the first similarity being calculated between a feature vector extracted from the query image through learned feature extraction for outputting the feature vector and a feature vector extracted from reference images labeled by the feature extraction; calculating a second similarity as a similarity determined using information on features, based on information on a feature different from the feature vector of the query image and information on the features of the reference images; and calculating an integrated similarity by integrating the calculated first similarity and the calculated second similarity, wherein for similarities between a basic image, an image similar to the basic image, and an image dissimilar to the basic image of the reference images, at least the feature extraction is learned such that a margin based on a second similarity between the basic image and the similar image and a second similarity between the basic image and the dissimilar image increases as the second similarity between the basic image and the dissimilar image increases relative to the second similarity between the basic image and the similar image.

A fourth aspect of the present disclosure is a learning method for causing a computer to perform processing including: calculating a second similarity for a combination of reference images by using information on features different from feature vectors of the labeled reference images, the second similarity being calculated as a similarity determined using the information on the features; the reference images including a basic image as a reference of the labeling, a similar image that is the reference image similar to the basic image, and a dissimilar image that is the reference image dissimilar to the basic image, and updating the parameter of a neural network such that a margin increases as the second similarity between the basic image and the dissimilar image increases relative to the second similarity between the basic image and the similar image, the parameter being updated by using a loss function including a first similarity between the feature vector of the basic image and the feature vector of the similar image, a first similarity between the feature vector of the basic image and the feature vector of the dissimilar image, and the margin based on the second similarity between the basic image and the similar image and the second similarity between the basic image and the dissimilar image, the feature vectors being outputted from the neural network for receiving a predetermined image and outputting the feature vectors.

A fifth aspect of the present disclosure is a retrieval program for causing a computer to perform the same processing as the retrieval method of the third aspect.

A sixth aspect of the present disclosure is a learning program for causing a computer to perform the same processing as the learning method of the fourth aspect.

Effects of the Invention

The retrieval apparatus, the retrieval method, and the retrieval program of the disclosed technique achieve the effect of accurately retrieving an object in an image by complementarily combining multiple image retrieval methods.

The learning apparatus, the learning method, and the learning program of the disclosed technique achieve the effect of learning a neural network for accurately retrieving an object in an image by complementarily combining multiple image retrieval methods.

DESCRIPTION OF EMBODIMENT

Figure 1:
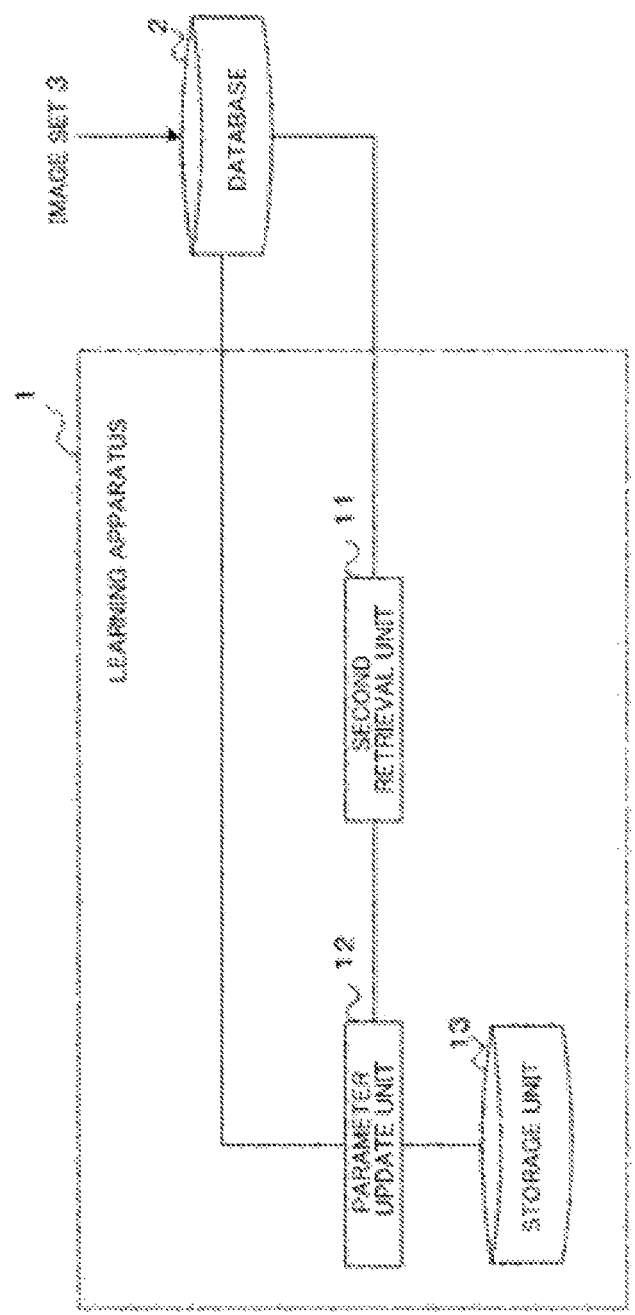
FIG. 1 is a block diagram illustrating the configuration of a learning apparatus according to the present embodiment.

An example of an embodiment of the disclosed technique will be described below with reference to the accompanying drawings. In the drawings, the same or equivalent constituent elements and parts are indicated by the same reference numerals. Dimensional ratios in the drawings are exaggerated for purposes of illustration and may be different from actual ratios.

The configuration and operations of the present embodiment will be described below.

<The Configuration of a Learning Apparatus>

FIG. 1 is a block diagram illustrating the configuration of a learning apparatus according to the present embodiment.

As illustrated in FIG. 1, a learning apparatus 1 includes a second retrieval unit 11, a parameter update unit 12, and a storage unit 13. The second retrieval unit 11 corresponds to a second retrieval unit of a retrieval apparatus, which will be described later, from among a first retrieval unit and the second retrieval unit of the retrieval apparatus and calculates a second similarity by using information on a feature different from a feature vector.

The learning apparatus 1 is connected to a database 2 via communication means and mutually communicates information. The database 2 can be constructed using, for example, a file system installed in a general-purpose computer. In the present embodiment, for example, the reference images of an image set 3 and various kinds of data on the reference images are stored in advance in the database 2. In the present embodiment, identifiers such as an ID (identification) with a serial number and a unique image file name are provided so as to uniquely identify the reference images of the image set 3. The database 2 stores the reference images such that the identifiers of the reference images are associated with image data on the reference images.

Alternatively, the database 2 may be similarly implemented and configured by an RDBMS (Relational Database Management System) or the like. The information stored in the database 2 may further include, for example, information on the contents of the reference images (the titles, outlines, keywords of the reference images, or the like) and information on the formats of the reference images (the data amounts of the reference images and the sizes of thumbnails or the like) as metadata. However, the storage of the information is not always necessary in the implementation of the present disclosure.

The database 2 may be disposed inside or outside of the learning apparatus 1. The communication means is any known method. In the present embodiment, the database 2 is disposed outside the learning apparatus 1. The database 2 is connected so as to communicated with the learning apparatus 1 via the Internet and networks such as a TCP/IP (Transmission Control Protocol/Internet Protocol) network.

The image set 3 is a set of reference images attached with labels, each indicating a specific object in each reference image. The label is, for example, an integer. The same integer may be allocated to the reference images including the same specific object. The image set 3 includes at least two labeled reference images. In the following processing, the reference images of the image set 3 are read from the database 2.

Figure 2:
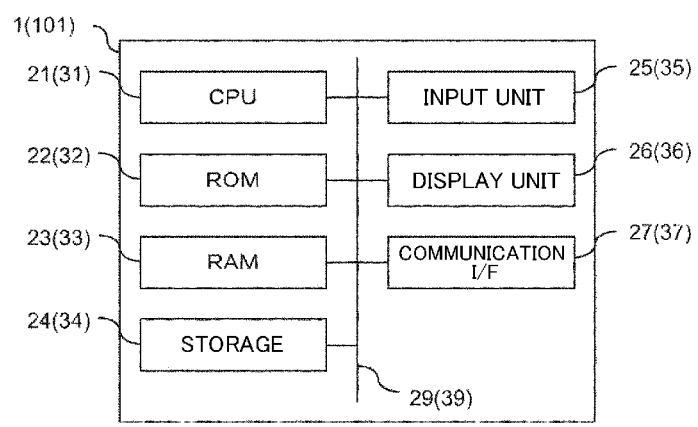
FIG. 2 is a block diagram illustrating the hardware configuration of the learning apparatus and a retrieval apparatus.

The hardware configuration of the learning apparatus 1 will be described below. FIG. 2 is a block diagram illustrating the hardware configuration of the learning apparatus 1.

As illustrated in FIG. 2, the learning apparatus 1 includes a CPU (Central Processing Unit) 21, a ROM (Read Only Memory) 22, a RAM (Random Access Memory) 23, a storage 24, an input unit 25, a display unit 26, and a communication interface (I/F) 27. The configurations are connected via a bus 29 so as to communicate with one another.

The CPU 21 is a central processing unit that executes various programs and controls the units. Specifically, the CPU 21 reads a program from the ROM 22 or the storage 24 and executes the program with the RAM 23 serving as a work area. The CPU 21 controls the configurations and performs various computations according to programs stored in the ROM 22 or the storage 24. In the present embodiment, a learning program is stored in the ROM 22 or the storage 24.

The ROM 22 stores a variety of programs and data. The RAM 23 serves as a work area for temporarily storing programs or data. The storage 24 includes an HDD (Hard Disk Drive) or an SSD (Solid State Drive) and stores various programs including an operating system and a variety of data.

The input unit 25 includes pointing devices such as a mouse and a keyboard and is used for performing various inputs.

The display unit 26 is, for example, a liquid crystal display that displays a variety of information. The display unit 26 may be a touch panel acting as the input unit 25.

The communication interface 27 is an interface for communications with other devices such as a terminal. For example, standards such as Ethernet (registered trademark), FDDI, and Wi-Fi (registered trademark) are used.

The functional configurations of the learning apparatus 1 will be described below. The learning program stored in the ROM 22 or the storage 24 is read by the CPU 21 and is developed and executed in the RAM 23, so that the functional configurations are implemented.

The storage unit 13 stores a CNN as a neural network and the parameter of the CNN. The CNN receives a predetermined image and outputs a feature vector. The CNN of the present embodiment is not limited, provided that the CNN receives an image and outputs a feature vector of a fixed dimension. The layers of the CNN may have any known configuration. For example, the CNN may be configured such that all coupled layers are removed from VGG16, ResNet101, or the like that is described in NPL 2. Alternatively, at least a part of an existing proper learning parameter may be used as the initial value of the parameter of the CNN. Hereinafter, processing for the CNN is reading and updating for the CNN of the storage unit 13.

By using information on features different from the feature vectors of labeled reference images, the second retrieval unit 11 calculates a second similarity, which is a similarity determined using information on features, for a combination of the reference images. A feature in the information is different from the feature vector as described below.

The second retrieval unit 11 reads the reference images of the image set 3 stored in the database 2, calculates the similarity of a pair of the reference images, and outputs the similarity as a second similarity. The similarity can be determined by any method. For example, a local feature amount like SIFT described in NPL 1 may be calculated from each of the reference images of the image set 3, and a similarity may be calculated by matching local feature amounts as described in PTL 1. If the reference images of the image set 3 have metadata, a similarity may be calculated using the metadata. For example, the degree of association of an allocated keyword or the similarity of an outline may be used. The local feature amount and others are features different from the feature vector and are used as the information on features.

The parameter update unit 12 updates the parameter of the CNN by using a loss function such that a margin increases as a second similarity between a basic image and a dissimilar image increases relative to a second similarity between the basic image and a similar image. In this case, the reference images are classified as a basic image, an image similar to the basic image, and an image dissimilar to the basic image. The basic image, a similar image, and a dissimilar image are identified by the labels of the reference images. The reference image having the same label as the basic image is identified as a similar image, whereas the reference image having a different label from the basic image is identified as a dissimilar image. A specific method for the second retrieval unit 11 will be described below. A specific method for the parameter update unit 12 will be described below.

The parameter update unit 12 reads the reference images, performs convolution by the parameter of the CNN as an input to the CNN, and extracts and acquires a feature vector having a fixed dimension. Subsequently, the similarity of a feature vector between the reference images is calculated as a first similarity. The obtained first similarity is a first similarity between the feature vector of the basic image and the feature vector of a similar image and a first similarity between the feature vector of the basic image and the feature vector of a dissimilar image.

The loss function includes a first similarity between the feature vector of the basic image and the feature vector of a similar image, a first similarity between the feature vector of the basic image and the feature vector of a dissimilar image, and a margin. The margin is based on a second similarity between the basic image and a similar image and a second similarity between the basic image and a dissimilar image as indicated by expression (2), which will be described later.

The loss function may include any function with a margin m as indicated by expression (1) below. In the present embodiment, Triplet Loss described in NPL 2 is used as indicated by expression (1):

[Math. 1]

$$\tfrac{1}{2}\mathrm{MAX}(0, d_p - d_n + m) \quad (1)$$

where $d_p$ is a distance between the feature vector of the basic image and the feature vector of an image similar to the basic image, and $d_n$ is a distance between the feature vector of the basic image and the feature vector of an image dissimilar to the basic image. For the distance, any scales may be used for measuring a distance between feature vectors, for example, an L1 distance and an L2 distance. m indicates a margin as a difference in distance. m in the present embodiment is determined by, for example, expression (2) below.

[Math. 2]

$$\lambda(s_n - s_p) + m_0 \quad (2)$$

where $s_p$ is a second similarity between the basic image and a similar image, $s_n$ is a second similarity between the basic image and a dissimilar image. $m_0$ is a reference margin which is the base of margin and may be set at, for example, 0.1. $\lambda$ is a parameter indicating the degree of influence of the second similarity. The parameter is tuned according to the second similarity. For example, if the second similarity ranges from −1.0 to 1.0 and $m_0$ is 0.1, $\lambda$=0.05 may be determined.

The parameter update unit 12 optimizes the parameter of the CNN by using the loss function of expression (1) with a margin determined by expression (2) for each set of three images: the basic image, a similar image, and a dissimilar image. This can increase a margin for a high second similarity between the basic image and a dissimilar image and reduce a margin for a low second similarity, thereby updating the parameter of the CNN complementarily to the second similarity.

Alternatively, multiple similarities according to methods other than the CNN may be provided by adding the same term as the first term of expression (2) to expression (2).

Instead of the margin determined by expression (2) for each set of three images, i.e. basic image, a similar image, and a dissimilar image, the margin may be averaged for each of the labels attached to the reference images. This ensures learning for outliers of the second similarity.

Learning with the loss function of expression (1) is not always necessary for all sets of the three images. Learning may be performed only on sets of a high second similarity between the basic image and a dissimilar image. For example, learning with the loss function may be performed using only sets of the three images if the second similarity $s_n$ is not lower than a predetermined threshold value relative to the second similarity $s_p$ and the margin m of expression (2) is not smaller than a threshold value.

The parameter update unit 12 learns the parameter of the CNN by backpropagation to the parameter of the CNN so as to optimize the loss function, and stores the updated parameter in the storage unit 13.

<The Configuration of the Retrieval Apparatus>

The configuration of the retrieval apparatus according to the present embodiment will be described below. The retrieval apparatus calculates a similarity to the reference image while a query image to be retrieved is used as a retrieval key.

Figure 3:
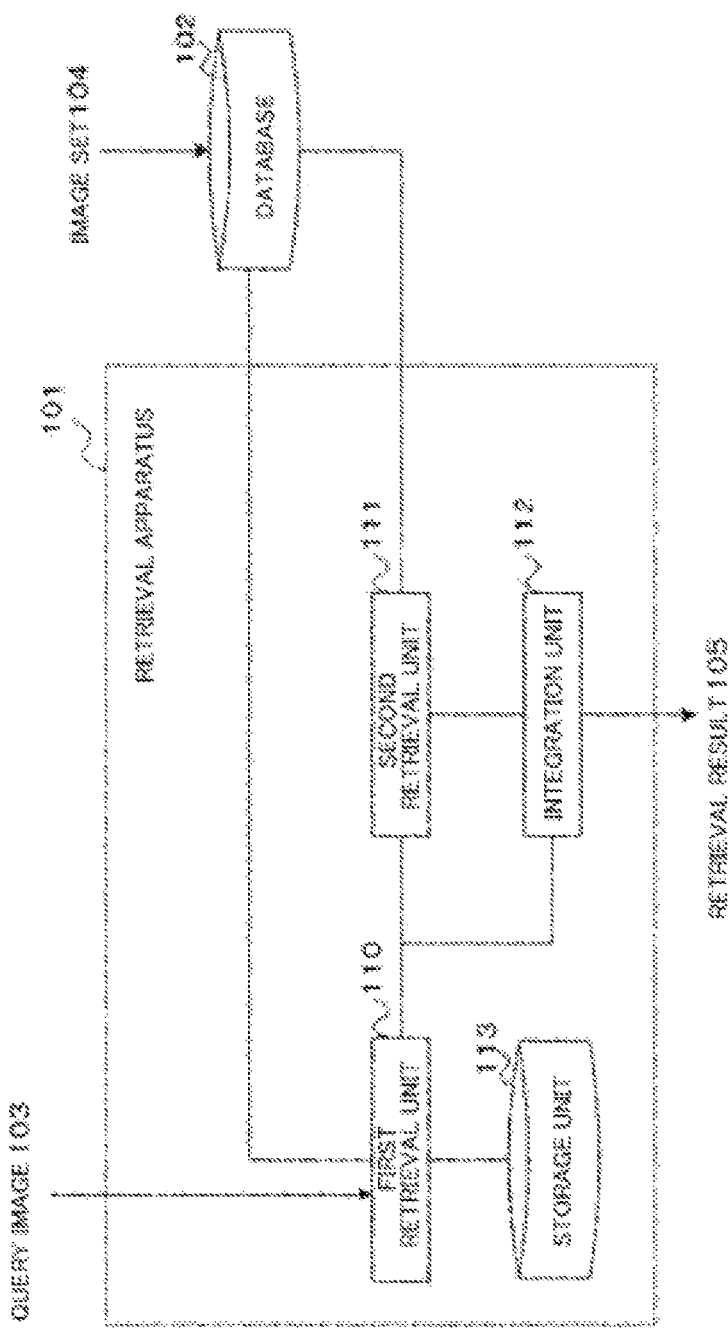
FIG. 3 is a block diagram illustrating the configuration of the retrieval apparatus according to the present embodiment.

FIG. 3 is a block diagram illustrating the configuration of the retrieval apparatus according to the present embodiment.

As illustrated in FIG. 3, a retrieval apparatus 101 includes a first retrieval unit 110, a second retrieval unit 111, an integration unit 112, and a storage unit 113.

The retrieval apparatus 101 is connected to a database 102 via communication means and mutually communicates information. The database 102 is configured like the database 2 and stores an image set 104 of labeled reference images. It is not always necessary to use the images of the image set 104 as reference images. Additional images may be stored as reference images.

The storage unit 113 stores the parameter of the CNN learned by the learning apparatus 1. The CNN used by the retrieval apparatus 101 of the present embodiment is the CNN described for the learning apparatus 1. The CNN is a learned neural network that is used in the first retrieval unit 110. Through the learning of the parameter, the CNN is learned complementarily to a second similarity calculated by the second retrieval unit 111. Feature extraction for outputting a learned feature vector is the parameter of the CNN that receives a predetermined image and outputs a feature vector.

The retrieval apparatus 101 can be configured by the same hardware configuration as the learning apparatus 1. As illustrated in FIG. 2, the retrieval apparatus 101 includes a CPU 31, a ROM 32, a RAM 33, a storage 34, an input unit 35, a display unit 36, and a communication I/F 37. The configurations are connected via a bus 39 so as to communicate with one another. A retrieval program is stored in the ROM 32 or the storage 34.

The first retrieval unit 110 receives a query image 103 to be retrieved and calculates a first similarity between a feature vector extracted from the query image 103 and each of the reference images. As in the learning apparatus 1, a first similarity is a similarity between feature vectors. The feature vector is extracted by the learned processing of the CNN. The processing of the CNN is an example of learned feature extraction. For similarities between the basic image and a similar image and a dissimilar image, the processing of the CNN in the first retrieval unit 110 is learned such that a margin increases as a second similarity between the basic image and a dissimilar image increases relative to a second similarity between the basic image and a similar image. As described above, the processing of the CNN may be learning of a limited set of images with a threshold value. A mode of calculation of a first similarity will be described below.

The first retrieval unit 110 receives the reference images of the image set 104 stored in the database 102 and the query image 103 and then extracts a feature vector by using the CNN parameter stored in the storage unit 113. The feature vector is extracted by the same method as the extraction of the feature vector by the parameter update unit 12 illustrated in the learning apparatus 1. The first retrieval unit 110 calculates a similarity between the feature vector of the query image 103 and the feature vector of each reference image of the image set 104 and outputs the similarity as a first similarity. The similarity may be calculated by using any scales used for calculating a similarity between feature vectors. For example, a cosine similarity may be used. Moreover, the feature vector of each reference image may be the feature vector of each reference image of the image set 104 stored in the database 102. The feature vector is extracted in advance and is stored in the database 102.

The second retrieval unit 111 calculates the second similarity based on information on the features of the query image 103 and the features of the reference images. The information on the features includes a similarity determined using information on features different from the feature vector. For example, the information on the features includes a local feature amount like SIFT. A mode of calculation of a second similarity will be described below.

The second retrieval unit 111 receives the reference images of the image set 104 stored in the database 102 and the query image 103, calculates a similarity between the query image 103 and each image of the image set 104, and outputs the similarity as a second similarity. The similarity is, for example, a local feature amount like SIFT as in the case of the similarity in the second retrieval unit 11 illustrated in the learning apparatus 1. If a local feature amount is used, the second similarity of each reference image may be the local feature amount of each reference image of the image set 104 stored in the database 102. The local feature amount is extracted in advance and is stored in the database 102.

The integration unit 112 calculates an integrated similarity by integrating a first similarity calculated by the first retrieval unit 110 and a second similarity calculated by the second retrieval unit 111 and outputs the integrated similarity as a retrieval result 105. Specifically, a first similarity x and a second similarity y are integrated by the weighted linear sum ax+by of the similarities, obtaining the integrated similarity. An integrated similarity is calculated for the query image 103 and each of the reference images. The retrieval result 105 may include a reference image having an integrated similarity not lower than a threshold value. The similarities may be integrated by any other methods. For example, the similarities may be integrated by SVM or Rank-SVM. The integrated similarity and information linked to the corresponding reference image (e.g., an ID with a serial number) are outputted as the retrieval result 105.

<The Operations of the Learning Apparatus>

The operations of the learning apparatus 1 will be described below.

Figure 4:
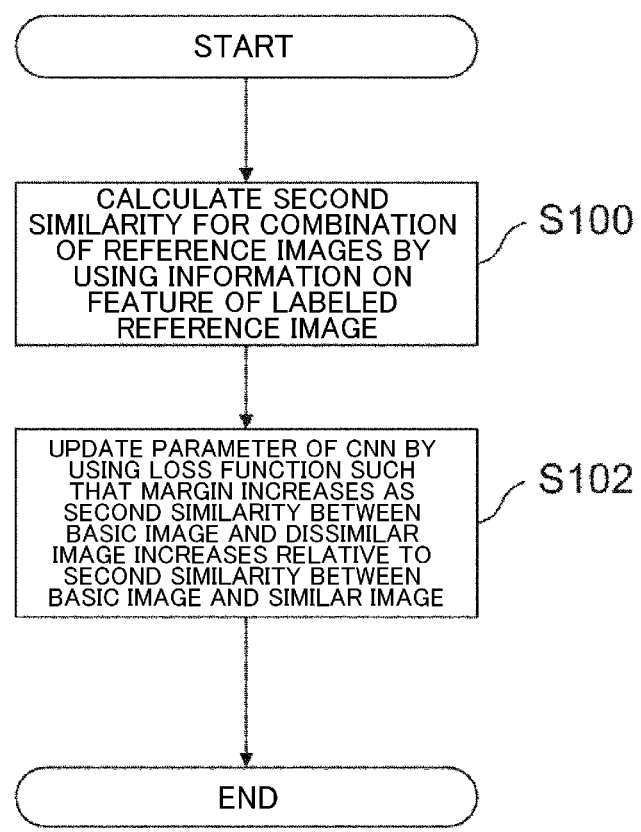
FIG. 4 is a flowchart indicating a flow of learning by the learning apparatus.

FIG. 4 is a flowchart indicating a flow of learning by the learning apparatus 1. The CPU 21 reads the learning program from the ROM 22 or the storage 24 and develops and executes the program in the RAM 23, so that learning is performed.

In step S100, the CPU 21 calculates a second similarity, which is a similarity determined using information on features, for a combination of the reference images by using information on the features of the labeled reference images. The information on the features includes a feature different from a feature vector. For example, the information on the features includes a local feature amount like SFIT.

In step S102, the CPU 21 updates the parameter of the CNN by using a loss function such that a margin increases as a second similarity between a basic image and a dissimilar image increases relative to a second similarity between the basic image and a similar image. The loss function includes a first similarity between the feature vector of the basic image and the feature vector of a similar image, a first similarity between the feature vector of the basic image and the feature vector of a dissimilar image, and a margin. The margin is based on a second similarity between the basic image and a similar image and a second similarity between the basic image and a dissimilar image.

As described above, the learning apparatus 1 of the present embodiment enables learning of a neural network for accurately retrieving an object in an image by complementarily combining multiple image retrieval methods.

<The Operations of the Retrieval Apparatus>

The operations of the retrieval apparatus 101 will be described below.

Figure 5:
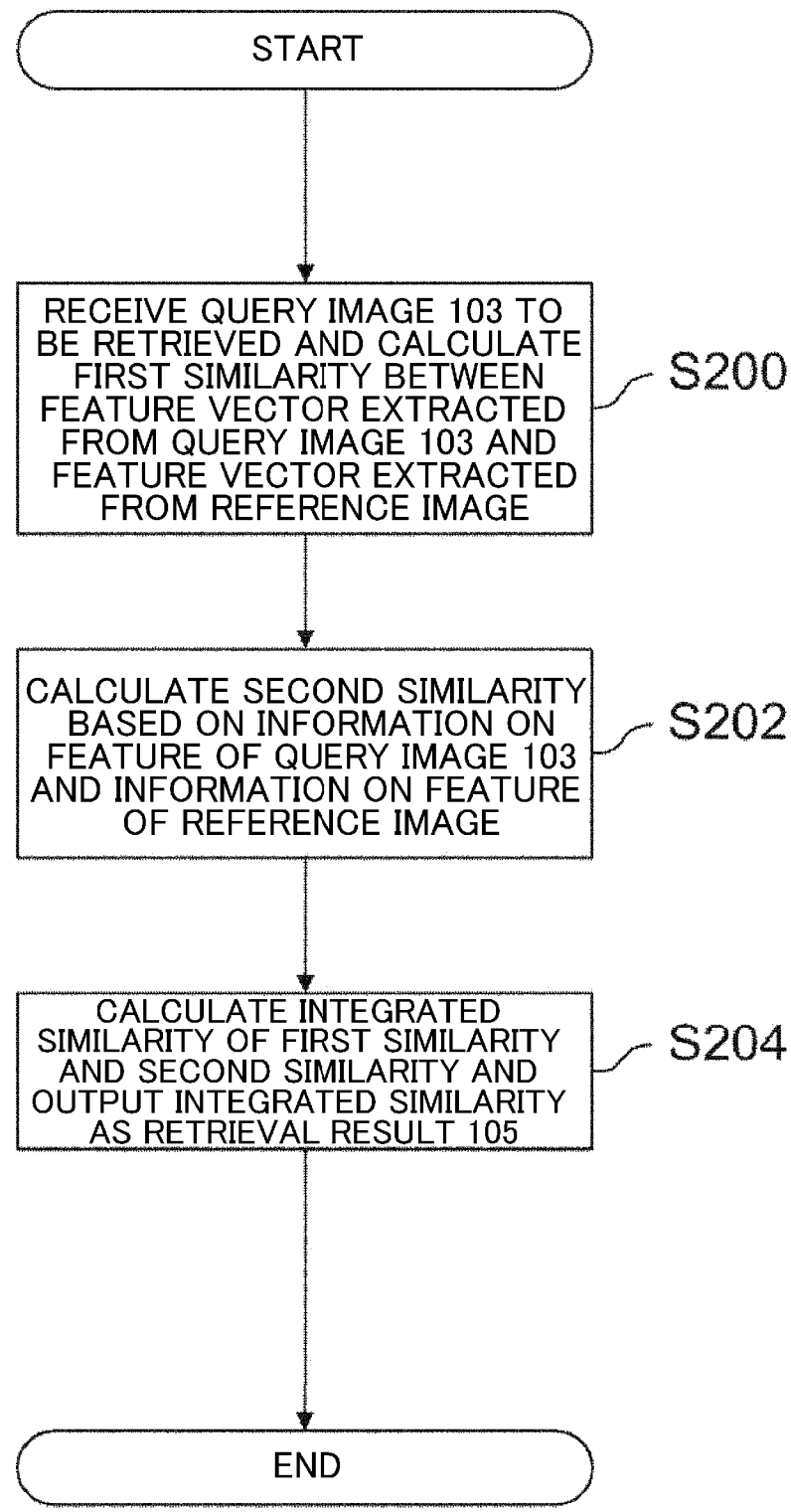
FIG. 5 is a flowchart indicating a flow of retrieval by the retrieval apparatus.

FIG. 5 is a flowchart indicating a flow of learning by the retrieval apparatus 101. The CPU 31 reads the learning program from the ROM 32 or the storage 34 and develops and executes the program in the RAM 33, so that learning is performed.

In step S200, the CPU 31 receives the query image 103 to be retrieved and calculates a first similarity between a feature vector extracted from the query image 103 and each of the reference images. The feature vector is extracted by the learned processing of the CNN. For similarities between the basic image and a similar image and a dissimilar image, the processing of the CNN is learned such that a margin increases as a second similarity between the basic image and a dissimilar image increases relative to a second similarity between the basic image and a similar image.

In step S202, the CPU 31 calculates the second similarity based on information on the features of the query image 103 and the features of the reference images. The information on the features includes a feature different from a feature vector. For example, the information on the features includes a local feature amount like SIFT.

In step S204, the CPU 31 calculates an integrated similarity by integrating a first similarity calculated in S200 and a second similarity calculated in step S202 and outputs the integrated similarity as the retrieval result 105.

As described above, the retrieval apparatus 101 of the present embodiment can accurately retrieve an object in an image by complementarily combining multiple image retrieval methods.

Learning or retrieval by a CPU having read software (program) according to the embodiment may be performed by various processors other than the CPU. In this case, the processors may be, for example, a PLD (Programmable Logic Device) having a circuit configuration that is changeable after the manufacturing of an FPGA (Field-Programmable Gate Array) or the like and a dedicated electric circuit acting as a processor with a circuit configuration designed specifically for performing specific processing for an ASIC (Application Specific Integrated Circuit). Alternatively, learning or retrieval may be performed by one of the processors or a combination of at least two processors of the same type or different types (for example, multiple FPGAs and a combination of a CPU and an FPGA). More specifically, a hardware structure for the processors is an electric circuit in which circuit elements such as semiconductor devices are combined.

In the foregoing embodiment, the learning program is stored (installed) in advance in the storage 24. The present invention is not limited to this configuration. The program to be provided may be stored in non-transitory storage media such as a CD-ROM (Compact Disk Read Only Memory), a DVD-ROM (Digital Versatile Disk Read Only Memory), and USB (Universal Serial Bus) memory. Alternatively, the program may be downloaded from an external device via a network. The retrieval program may be similarly downloaded.

Regarding the foregoing embodiment, appendixes are disclosed as follows:

(Appendix 1)

A retrieval apparatus including:

a memory; and at least one processor connected to the memory, wherein the processor receives a query image to be retrieved and calculates a first similarity as a similarity between feature vectors, the first similarity being calculated between a feature vector extracted from the query image through learned feature extraction for outputting the feature vector and a feature vector extracted from reference images labeled by the feature extraction, the processor calculates a second similarity as a similarity determined using information on features, based on information on a feature different from the feature vector of the query image and information on the features of the reference images, the processor calculates an integrated similarity by integrating the first similarity calculated by the first retrieval unit and the second similarity calculated by the second retrieval unit, and for similarities between a basic image, an image similar to the basic image, and an image dissimilar to the basic image of the reference images, at least the feature extraction is learned such that a margin based on the second similarity between the basic image and the similar image and the second similarity between the basic image and the dissimilar image increases as the second similarity between the basic image and the dissimilar image increases relative to the second similarity between the basic image and the similar image.

(Appendix 2)

A non-transitory storage medium storing a retrieval program, the retrieval program causing a computer to receive a query image to be retrieved and calculate a first similarity as a similarity between feature vectors, the first similarity being calculated between a feature vector extracted from the query image through learned feature extraction for outputting the feature vector and a feature vector extracted from reference images labeled by the feature extraction, the retrieval program causing the computer to calculate a second similarity as a similarity determined using information on features, based on information on a feature different from the feature vector of the query image and information on the features of the reference images, the retrieval program causing the computer to calculate an integrated similarity by integrating the first similarity calculated by the first retrieval unit and the second similarity calculated by the second retrieval unit, for similarities between a basic image, an image similar to the basic image, and an image dissimilar to the basic image of the reference images, the retrieval program causing the computer to learn at least the feature extraction such that a margin based on the second similarity between the basic image and the similar image and the second similarity between the basic image and the dissimilar image increases as the second similarity between the basic image and the dissimilar image increases relative to the second similarity between the basic image and the similar image.

REFERENCE SIGNS LIST

1 Learning apparatus
2 Database
3 Image set
11 Second retrieval unit
12 Parameter update unit
13 Storage unit
101 Retrieval apparatus
102 Database
103 Query image
104 Image set
105 Retrieval result
110 First retrieval unit
111 Second retrieval unit
112 Integration unit
113 Storage unit

The invention claimed is:

1. A retrieval apparatus comprising circuitry configured to execute operations comprising:

receiving a query image to be retrieve;

calculating a first similarity as a similarity between feature vectors, the first similarity being calculated between a feature vector extracted from the query image through learned feature extraction for outputting the feature vector and a feature vector extracted from reference images labeled by the feature extraction;

calculating a second similarity as a similarity determined using information on features, based on information on a feature different from the feature vector of the query image and information on features of the reference images; and calculating an integrated similarity by integrating the first similarity and the second similarity, wherein for similarities between a basic image, an image similar to the basic image, and a dissimilar image that is dissimilar to the basic image of the reference images, at least the feature extraction is learned such that a margin based on a second similarity between the basic image and the similar image and a second similarity between the basic image and the dissimilar image increases as the second similarity between the basic image and the dissimilar image increases relative to the second similarity between the basic image and the similar image.

2. A learning apparatus comprising circuitry configured to execute operations comprising:

calculating a second similarity for a combination of reference images by using information on features different from feature vectors of labeled reference images, the second similarity being calculated as a similarity determined using the information on the features, the reference images including a basic image as a reference of the labeling, a similar image that is the reference image similar to the basic image, and a dissimilar image that is the reference image dissimilar to the basic image; and updating a parameter of a neural network such that a margin increases as the second similarity between the basic image and the dissimilar image increases relative to a second similarity between the basic image and the similar image, the parameter being updated by using a loss function including a first similarity between a feature vector of the basic image and a feature vector of the similar image, a first similarity between the feature vector of the basic image and a feature vector of the dissimilar image, and the margin based on the second similarity between the basic image and the similar image and the second similarity between the basic image and the dissimilar image, the feature vectors being outputted from the neural network for receiving a predetermined image and outputting the feature vectors.

3. The learning apparatus according to claim 2, wherein for a set of the basic image, the similar image, and the dissimilar image, the circuitry further configured to execute a method comprising: updating the parameter of the neural network according to the loss function by using only the set of the three images if the second similarity between the basic image and the dissimilar image is at least a threshold value relative to the second similarity between the basic image and the similar image and the margin is at least a threshold value.

4. A computer-implemented retrieval method for retrieving, comprising:
receiving a query image to be retrieved;
calculating a first similarity as a similarity between feature vectors, the first similarity being calculated between a feature vector extracted from the query image through learned feature extraction for outputting the feature vector and a feature vector extracted from reference images labeled by the feature extraction;
calculating a second similarity as a similarity determined using information on features, based on information on a feature different from the feature vector of the query image and information on the features of the reference images; and
calculating an integrated similarity by integrating the calculated first similarity and the calculated second similarity, wherein
for similarities between a basic image, an image similar to the basic image, and a dissimilar image that is dissimilar to the basic image of the reference images, at least the feature extraction is learned such that a margin based on a second similarity between the basic image and the similar image and a second similarity between the basic image and the dissimilar image increases as the second similarity between the basic image and the dissimilar image increases relative to the second similarity between the basic image and the similar image.

5. The retrieval apparatus according to claim 1, the circuitry further configured to execute a method comprising:
determining an identity of the query image based on the first similarity between the feature vector extracted from a region in the query image and another feature vector extracted from another region that corresponds to the region in a reference image, wherein the feature vector indicates a local feature amount of the query image.

6. The retrieval apparatus according to claim 1, wherein the first similarity is based on a cosine similarity between the feature vector extracted from the query image through learned feature extraction and the feature vector extracted from a reference image of the reference images labeled by a feature extraction.

7. The retrieval apparatus according to claim 1, wherein the second similarity is based on a similarity between a first local feature amount associated with a first feature associated with the feature vector extracted from the query image through learned feature extraction and a second local feature amount associated with a second feature associated with the feature vector extracted from the reference images labeled by a feature extraction.

8. The learning apparatus according to claim 2, wherein the first similarity is based on a cosine similarity between a first feature vector associated with the basic image and a second feature vector associated with a reference image.

9. The learning apparatus according to claim 2, wherein the second similarity is based on a similarity between a first local feature amount associated with a first feature associated with the feature vector for the basic image and a second local feature amount associated with a second feature for a reference image.

10. The computer-implemented method according to claim 4, the method further comprising:
determining an identity of the query image based on the first similarity between the feature vector extracted from a region in the query image and another feature vector extracted from another region that corresponds to the region in a reference image, wherein the feature vector indicates a local feature amount of the query image.

11. The computer-implemented method according to claim 4, wherein the first similarity is based on a cosine similarity between the feature vector extracted from the query image through learned feature extraction and the feature vector extracted from a reference image labeled by a feature extraction.

12. The computer-implemented method according to claim 4, wherein the second similarity is based on a similarity between a first local feature amount associated with a first feature associated with the feature vector extracted from the query image through learned feature extraction and a second local feature amount associated with a second feature associated with the feature vector extracted from the reference images labeled by the feature extraction.

* * * * *